United States Patent
Kwon

(10) Patent No.: US 7,353,033 B2
(45) Date of Patent: Apr. 1, 2008

(54) POSITION-MATCHED INFORMATION SERVICE SYSTEM AND OPERATING METHOD THEREOF

(75) Inventor: Hyuck Jin Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 241 days.

(21) Appl. No.: 10/040,759

(22) Filed: Jan. 9, 2002

(65) Prior Publication Data
US 2002/0090943 A1 Jul. 11, 2002

(30) Foreign Application Priority Data
Jan. 9, 2001 (KR) ............... 2001-0001155

(51) Int. Cl.
*H04Q 7/20* (2006.01)
(52) U.S. Cl. ............... 455/456.3; 455/414.2; 709/219; 379/88.14; 705/30; 725/25
(58) Field of Classification Search ............ 455/433, 455/432.1, 435.1, 440, 456.1, 456.3, 456.2, 455/414.1, 414.2, 435; 709/219, 223, 245; 379/88.13, 88.1; 705/26, 30, 34; 725/25, 725/28; 704/270.1, 277
See application file for complete search history.

(56) References Cited

U.S. PATENT DOCUMENTS

| | | | |
|---|---|---|---|
| 6,256,498 B1 * | 7/2001 | Ludwig | 455/433 |
| 6,425,524 B2 * | 7/2002 | Pentel | 235/381 |
| 6,600,919 B1 * | 7/2003 | Kawase | 455/414.1 |
| 6,603,837 B1 * | 8/2003 | Kesanupalli et al. | 379/88.17 |
| 6,681,109 B1 * | 1/2004 | Leifer | 455/414.1 |
| 6,716,101 B1 * | 4/2004 | Meadows et al. | 455/456.1 |
| 6,847,823 B2 * | 1/2005 | Lehikoinen et al. | 455/456.1 |
| 6,865,261 B1 * | 3/2005 | Rao et al. | 379/93.12 |
| 6,868,335 B2 * | 3/2005 | Obradovich et al. | 701/208 |
| 6,950,881 B1 * | 9/2005 | Ndili | 709/246 |
| 7,031,703 B1 * | 4/2006 | Graf et al. | 455/432.1 |
| 2001/0012992 A1 * | 8/2001 | Kimpara et al. | 704/5 |
| 2002/0002452 A1 * | 1/2002 | Christy et al. | 704/3 |
| 2002/0046035 A1 * | 4/2002 | Kitahara et al. | 704/277 |
| 2002/0078092 A1 * | 6/2002 | Kim | 707/513 |
| 2002/0080063 A1 * | 6/2002 | Bloebaum et al. | 342/357.1 |
| 2003/0050058 A1 * | 3/2003 | Walsh et al. | 455/426 |
| 2003/0060211 A1 * | 3/2003 | Chern et al. | 455/456 |
| 2003/0088637 A1 * | 5/2003 | Hatano et al. | 709/216 |
| 2003/0208409 A1 * | 11/2003 | Mault | 705/26 |
| 2004/0110515 A1 * | 6/2004 | Blumberg et al. | 455/456.1 |
| 2005/0048978 A1 * | 3/2005 | Santhoff et al. | 455/442 |
| 2006/0052090 A1 * | 3/2006 | Behr et al. | 455/414.2 |

* cited by examiner

*Primary Examiner*—George Eng
*Assistant Examiner*—Khawar Iqbal
(74) *Attorney, Agent, or Firm*—Ked & Associates, LLP

(57) ABSTRACT

Disclosed is a position-matched information system and operating method thereof that determines a current location of a serviced subject by a position tracking using a mobile terminal of the corresponding service subjects and selectively transmitting one of the previously-registered contents suitable for the current location of the mobile terminal. Accordingly, a mobile subscriber is provided with current information relevant to the user's present location.

16 Claims, 4 Drawing Sheets

POSITION-MATCHED INFORMATION SERVICE SYSTEM AND OPERATING METHOD THEREOF

BACKGROUND OF THE INVENTION

1. Field of the Invention

The present invention relates to a mobile communication system, and more particularly, to a position-matched information system and operating method thereof.

2. Background of the Related Art

Radiodetermination is a rapidly developing technology, to which many efforts are being made for the development of mobile communication network technology. Standardization for a next generation mobile communication field is in progress to provide a variety of services to mobile subscribers using radiodetermination.

Radiodetermination in a mobile communication environment is a basic technology for a service that provides location information of a car, ship, or the like, or a service for tracking a location of a mobile terminal.

Current technology allows for a position tracking service in mobile communication that enables position tracking of a mobile terminal within a radius of several meters. This distance was previously a radius of several hundred meters.

Radiodetermination used for the position tracking service generally includes GPS (global positioning system) and DGPS (differential global positioning system). Such positioning systems, however, have various disadvantages. Hence, a new technique using a directional antenna has been proposed as a radiodetermination technique having a high accuracy and a low expense for a system construction.

The above-mentioned radiodetermination techniques are just exemplary; there are various other techniques available for radiodetermination. Further, advanced techniques for radiodetermination will be proposed along with the next generation mobile communication technology.

In another area of communication technology, mobile communication and Internet have merged together so as to enable Internet access and data transmission and reception through a mobile terminal. Thus, the next generation mobile communication service will bring a true wireless Internet era.

Wireless Internet technology has grown in popularity because it maximizes the convenience of usage by overcoming spatial limitations. Thus, by using mobile communication to access the Internet, users are not limited with respect to access points.

In order to provide Internet service based on the wireless Internet technology, radio Internet related standardization, such as wireless Internet browsers and operating systems, is required. Currently, wireless application protocol (WAP) leads in the standardization of wireless Internet technology.

WAP is a standard that supports mobile communication network subscribers, allowing users to conveniently gain access to the Internet. Most of the mobile communication network service providers are planning to expand the service ranges gradually using WAP. The mobile communication network subscribers will thus be provided with a variety of services that were previously limited to the conventional wire-based Internet.

Eventually, when the next generation mobile communication service is developed and deployed, a position tracking service based on radiodetermination will become an important service. Using such a service, various wireless Internet information services that use the position tracking service will be provided. Additionally, the wire-based Internet service which is currently in service will be universalized into the wireless Internet service. That is, there will be services provided to a user with various contents through the conventional wired Internet.

Unfortunately, the service that provides content suitable for the present location of a tracked mobile terminal based on position tracking in a mobile communication network has not been developed. Moreover, there is no service enabling a service provider to provide information relating to English conversation suitable for the location of the mobile terminal based specifically on the position tracking.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a position-matched information service for mobile communications.

Another object of the present invention is to provide a method of providing a position-matched information service that provides different information content corresponding to the respective locations (restaurant, hotel, airport, station, and the like) in accordance with the current location of the tracked mobile terminal based on a position tracking of a mobile communication network.

Another object of the present invention is to provide a method of providing a position-matched information service transmitting audio and video for English conversation and characters relating to the audio and video that are suitable for the current location (building or public site) of a mobile terminal tracked by matching position tracking information of the mobile terminal with electronic maps for the respective base transceiver stations, and English conversation multimedia suitable for the locations (buildings or public sites) of the electronic maps.

Another object of the present invention is to provide an information system and service capable of checking current locations of service subjects by a position tracking using mobile terminals of the corresponding service subjects and selectively transmitting one of previously-registered content items suitable for the current location of the mobile terminal.

To achieve at least these objects in whole or in parts, there is provided a method of providing a position-matched information service including a first step of, when a random contents providing service is requested from a mobile terminal, searching a stored contents among previously-stored contents corresponding to a location of the mobile terminal through a location tracking, and a second step of transmitting the searched contents to the mobile terminal, wherein the first and second steps are carried out in order.

In order to further achieve at least the above objects in whole or in parts, there is provided a method of providing a position-matched information service, including a first step of tracking a location of a specific mobile terminal, a second step of registering a final location of the mobile terminal, a third step of searching a specific English conversation data stored so as to correspond to the registered final location when the mobile terminal requests an English conversation service at the registered final location, and a fourth step of transmitting the searched English conversation data to the mobile terminal, wherein the first to fourth steps are carried out in order.

In order to further achieve at least the above objects in whole or in parts, there is provided a method of providing a position-matched English conversation service, including a first step of storing previously a plurality of English conversation multimedia corresponding to a plurality of situations of a plurality of sites, respectively, a second step of checking a service request location in accordance with a location tracking of a mobile terminal when the mobile terminal requests an English conversation service, a third step of grasping one of the sites corresponding to the checked service request location of the mobile terminal, and a fourth step of transmitting the stored English conversation multimedia of the site corresponding to the grasped site to the mobile terminal, wherein the first to fourth steps are carried out in order.

In order to further achieve at least the above objects in whole or in parts, there is provided a method of providing a position-matched English conversation service, including a first step of storing a restaurant English conversation multimedia previously, a second step of checking a present location of a mobile terminal when an English conversation service is requested from the mobile terminal, and a third step of transmitting the restaurant English conversation multimedia to the mobile terminal when it is checked that the present location of the mobile terminal is a restaurant.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Reference will now be made in detail to the preferred embodiments of the present invention, examples of which are illustrated in the accompanying drawings.

The preferred embodiment of the present invention relates to a position tracking technology on a mobile communication network. Moreover, the preferred embodiment further relates to a wireless Internet technology resulting from merging mobile communication with the Internet, so as to enable the mobile terminal to gain access to the Internet and to have data transmission/reception.

Therefore, the preferred embodiment of the present invention is provided with position tracking information on a mobile communication network so as to provide a wireless Internet service.

Figure 1:
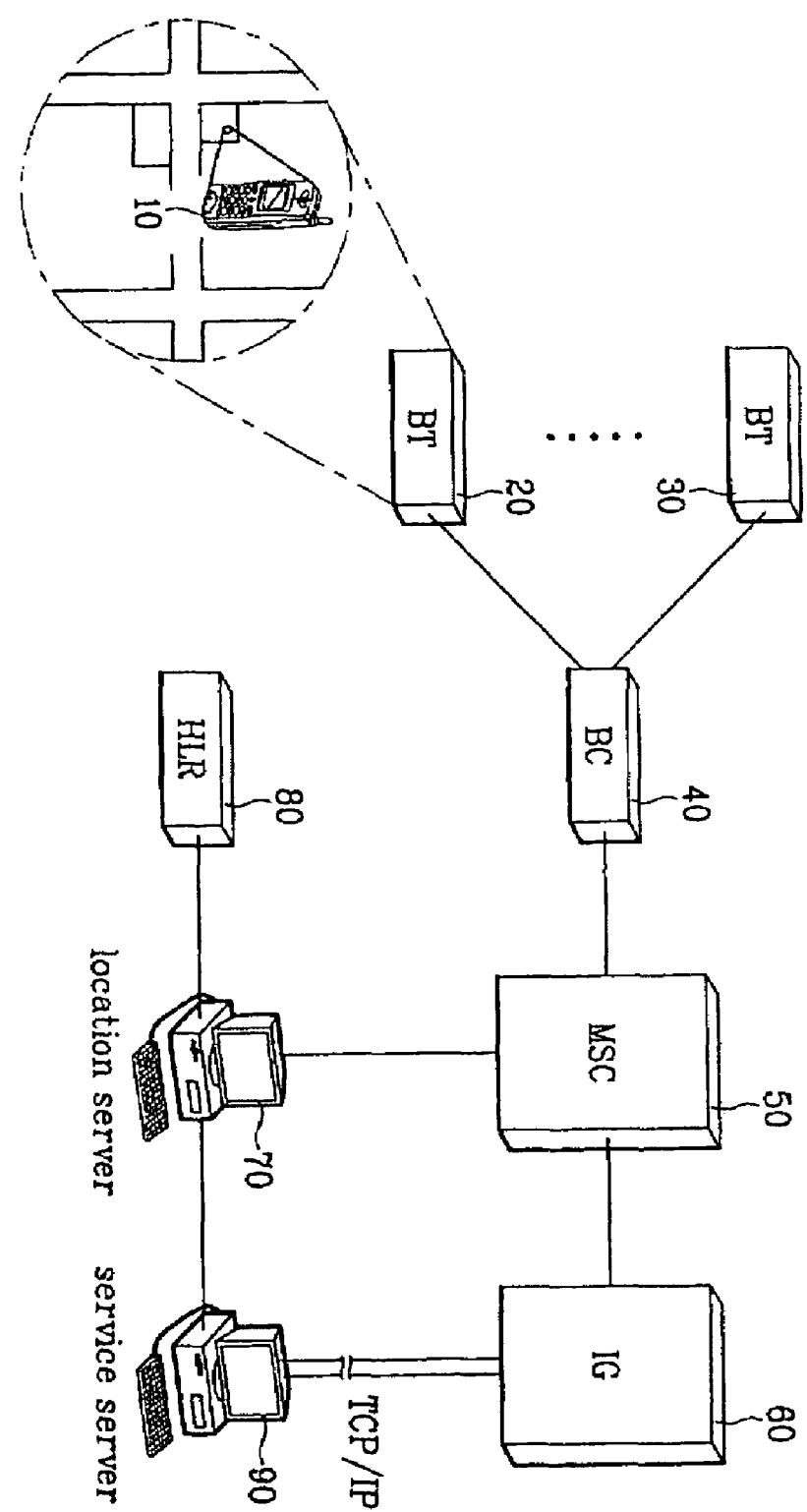
FIG. 1 illustrates a diagram for a system of providing a position-matched information service according to the preferred embodiment of the present information.

FIG. 1 illustrates a system of providing a position-matched information service according to the preferred embodiment of the present information. Referring to FIG. 1, the system preferably uses a wireless Internet access technology in the next generation mobile communication. Thus, a mobile terminal MT) 10 is provided with various Internet information services transmitted using transmission control protocol/Internet protocol (TCP/IP). Additionally, information services preferably provide different content to the MT 10 in accordance with the current location of the MT 10.

The preferred embodiment of the system further includes a mobile communication network that supports wireless access and an information service providing network which transfers various information services provided by Internet to the mobile communication network. WAP is preferably applied to the system, thereby describing a system for providing various information services through wireless Internet access.

The mobile communication network preferably includes a MT 10, a plurality of base transceiver stations (BTS) 20 to 30, and a base station controller (BC) 40. The system also preferably includes a mobile switching center (MSC) 50, an inter-gateway(IG) 60, a location server 70, and a home location register(HLR) 80.

General functions of such components of the mobile communication network are well-known, so a detailed discussion of their functions is omitted in this description.

Prior to the description of the respective components of the mobile communication network, the information service providing network will be described.

The information service providing network preferably includes a service server 90, which is linked to the mobile communication network through TCP/IP. The service server 90 transfers Internet data packets to the mobile communication network so as to provide various information services.

The service server 90 transmits data having a specific language style to the MT 10 using one transmission protocol operating on TCP/IP. For instance, data prepared with HTML (hypertext markup language) using HTTP (hypertext transfer protocol) operating on TCP/IP are transferred to the MT 10.

The service server 90 also possesses various kinds of linguistic conversation content. The service server 90 classifies for storage various English conversation multimedia for the respective locations as the linguistic conversation content so as to provide English language conversation multimedia corresponding to a site of the present location of the MT 10.

Each of the English conversation multimedia, which are classified into and stored in the corresponding locations distinguished regionally on the electronic map, is a preferably combination of media. The media preferably includes video data representing a virtual situation occurring in each location (building or public site), audio data representing the conversation and/or description/commentary of the virtual situation, and text data representing a transcription of the audio with characters. This English conversation multimedia is preferably transmitted to the MT 10 as Internet data packets.

When the service server 90 transmits the Internet data packets, including the English conversation multimedia, the Internet data packets pass through the components constructing the mobile communication network.

The following describes the operations of the respective components of the system for providing the position-matched information service.

The MT 10 provides a mobile communication network subscriber with the mobile communication services. The MT 10 receives various kinds of HTML information services transferred through TCP/IP in addition to voice communication service. In order to receive the information services, an inherent fixed IP address or a variable IP address is given to the MT 10. Moreover, a wireless Internet browser (for example, a micro browser) is installed at the MT 10.

When information services are requested by the MT 10 through Internet access, an operation of the mobile communication is described as follows when a random IP address allocated by the mobile communication network is given to the MT 10.

Once the MT 10 is powered on, a location registration message including a MIN (mobile identification number) for location registration of the MT 10 and an ESN (electronic serial number) of the MT 10 is transferred to the MSC 50 through a corresponding BTS 20, 30 and the BC 40. The MSC 50 translates the MIN included in the location registration message so as to identify a subscriber. When it is determined that the MT 10 is a valid subscriber, the MSC 50 preferably transfers a message including the MIN and ESN to the location server 70.

The location server 70 checks the validity of the MT 10 for the communication services using the MIN and ESN of the transferred message. If the service validity of the MT 10 is verified, the location server 70 completes the location registration of the MT 10, stores the resultant information (such as information about a kind of service available for the MT 10 and the like) in the home location register (HLR) 80. The location server 70 also transmits the resultant information to the MSC 50.

Specifically, the location server 70 stores a base transceiver station number in the home location register 80. In this case, the base transceiver station number is an inherent number set up previously for the base transceiver station that governs a service area in which the MT is located. The base transceiver station number is stored in the home location register 80 corresponding to the inherent numbers of the MIN and ESN of the mobile terminal when the location of the mobile terminal is registered. Hence, the service server 90 checks the site (building or public place) of the mobile terminal using the base transceiver station number transferred from the location server and the tracked position of the mobile terminal.

When there is an Internet access call requesting the position-matched information service from the MT 10 having completed its location registration, the MSC 50 preferably sets up a call routine on the mobile communication network for Internet access through an inter-connection with the location server 70 and home location register 80.

After setting up the call routine on the mobile communication network, the MSC 50 preferably sets up an Internet access call to the information service provider network for inter-working with the IG (inter-gateway) 60. The BC (base controller) 40 then checks radio resources (traffic channels) of the corresponding base transceiver stations (BTS) 20, 30 for a call setup, so as to command a channel allocation for the corresponding call. The call setup for the MT 10 requesting the information service is thus set-up. In this case, the IG 60 allocates one IP address to the call requesting the Internet access, and also allocates a MODEM resource to provide an information service according to the IP address.

After the call has been setup to the information service providing network, the MSC 50 requests service from the service server 90 of the information service providing network, which provides the information (for example, multimedia and text information) requested by the MT 10. If it is determined that the Internet access call of the MT 10 requires position-matched information service, the MSC 50 preferably tracks the location of the MT 10 using radiodetermination. The MSC 50 then provides the location server 70 with the location tracking information (one coordinate value). The location tracking for the MT 10 is preferably carried out on a continuous basis, and not only when the position-matched information service is requested. The location tracking information is thus continuously updated.

The location server 70 then stores the current tracking location of the MT 10 in the home location register 80 corresponding to the base transceiver station number to which the MT 10 belongs, based on radiodetermination. Simultaneously, the location server 70 transfers the base transceiver station number, at which the MT 10 requesting the Internet access call is located, and the tracking location within the domain of the base transceiver station to the service server 90. Because the tracking location of the MT 10 varies frequently, the location server 70 preferably temporarily stores the tracking location in an auxiliary storage, and not in the home location register 80.

The location tracking and the storage of the location tracking information are merely a matter of realizing a system. The core of the preferred embodiment is that the location server 70 informs the service server 90 of the tracking location of the MT 10.

Thus, the location server 70 preferably transfers the base transceiver station number at which the MT 10 is currently located and the tracking location within the domain of the base transceiver station to the service server 90.

The service server 90 acquires a specific building (for example, airport, restaurant, cinema, hotel, etc.) or a public place (for example garden, square, skiing resort, beach, etc.) where the MT 10 is currently located by matching the transferred tracking location (coordinate value) in the domain of the base transceiver station of the MT 10 with the electronic map corresponding to the transferred base transceiver station number.

Then, the service server 90 transmits the multimedia information that corresponds to the acquired building or public place to the mobile communication network.

In the mobile communication network, the multimedia content is transferred to the MT 10 through the routine of which call setup is completed. Namely, the IG 60 transforms the transferred multimedia content into WAP data using a transport protocol operating on TCP/IP. Additionally, the IG 60 converts a bandwidth and speed of the transmission. The transformed WAP data is transmitted to the MT 10 through the components of the mobile communication network, and the MT 10 outputs the received WAP data.

When the MT 10 outputs the multimedia content converted into WAP data, the content is preferably conversation multimedia. Therefore, the MT 10 is preferably equipped with a display module, which simultaneously enables the output of video, audio, and characters.

A process of providing the position-matched information service according to the preferred embodiment based on the above recited construction and operation will be described below.

Figure 2:
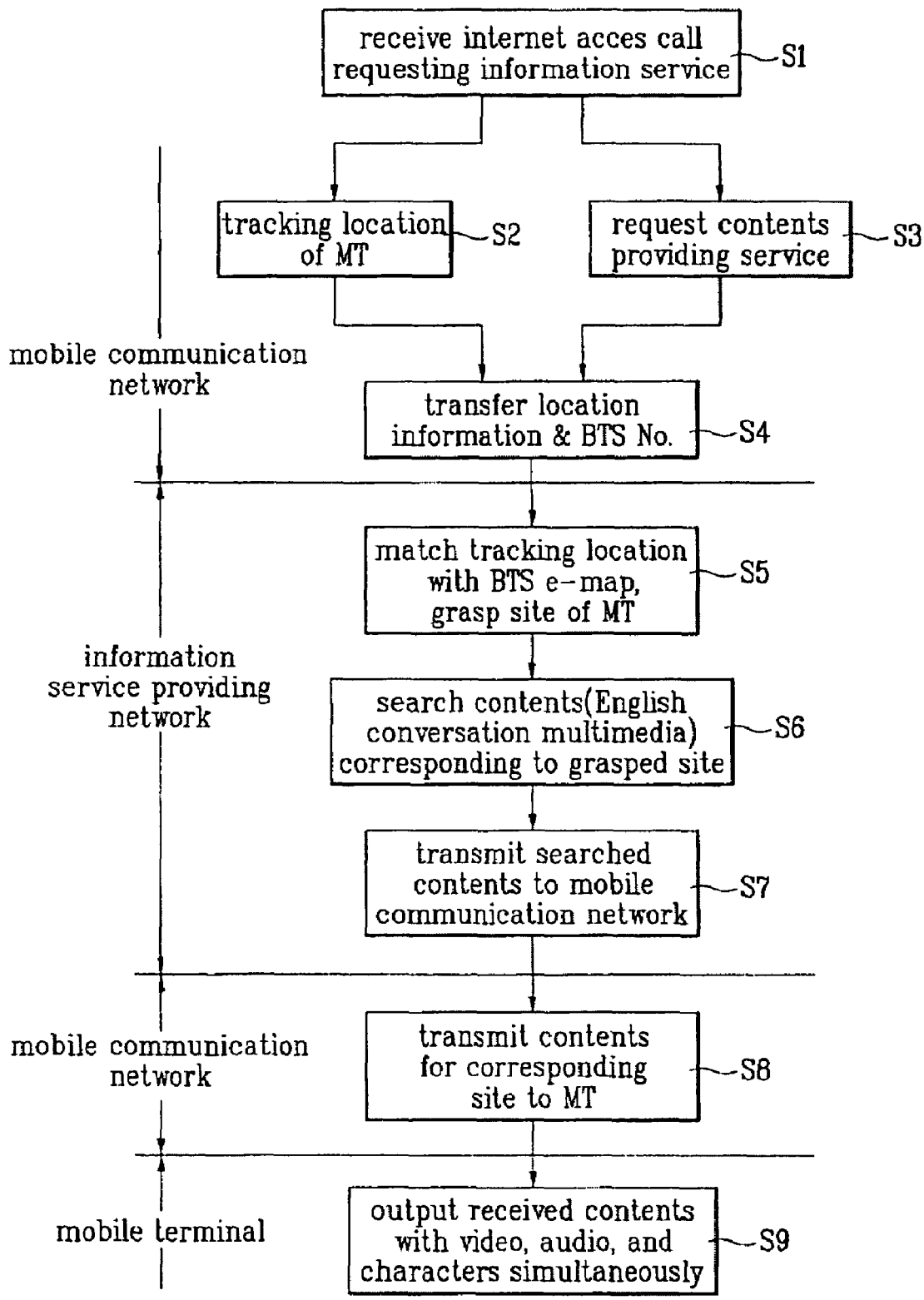
FIG. 2 is a flowchart illustrating a process of providing a position-matched information service according to the preferred embodiment of the present invention.

FIG. 2 is a flowchart illustrating a process of providing a position-matched information service according to the preferred embodiment. According to the process, a service server 90 of an information service providing network stores electronic maps for the respective service areas of base transceiver stations 20, 30 of a mobile communication network. The service server 90 also stores content for various situations in accordance with the respective sites (especially, buildings, public places, etc.) that are located in the domains of the stored electronic maps. It is preferable that the "various situations" means that a conversation is conducted with a third party at each site in a domain of the corresponding electronic map. For instance, in an airport lobby, the situations may include the confirmation of a reservation, ticketing, driving directions, and the like. The third party need not be a person with whom the conversation takes place, but could be an interactive dialog with an information source providing real time information.

The service server 90 preferably retains content for various situations. The contents are stored and classified into different English conversation multimedia in accordance with the places discriminated in the domain of the electronic maps. Each of the English conversation multimedia preferably includes the combination of video data representing the possible virtual situations for the corresponding site (building, public place), audio data representing the conversation (with specific language) of the corresponding virtual situation, and text data represented by characters expressing the audio conversation.

Thus, referring to FIG. 2, in the mobile communication network, an Internet access call requesting position-matched information service is first received from the mobile terminal (S1). A location tracking for the mobile terminal is initiated (S2) and simultaneously, a content providing service is requested to the information service providing network (S3).

The location server then transfers the latest location information of the mobile terminal requesting the service. This is preformed by sending location tracking information and the inherent number of the base transceiver station at which the mobile terminal is located to the service server (S4). Accordingly, the service server of the information service providing network receives a request for contents providing service through the mobile communication network. The service server also receives the current base transceiver station number of the mobile terminal requesting the information and a tracking location in the corresponding base transceiver area from the location server. In this case, the request for the contents providing service is for the provision of the English conversation multimedia.

Subsequently, the service server matches the transferred base transceiver station number and tracking location with the electronic map of the corresponding base transceiver station, thereby acquiring the location of the current mobile terminal (S5). For example, the location of the mobile terminal may be a building such as airport, hotel, or the like or a public place such as park, square, or the like. It should be understood that the location is not limited to the building or public place, but extents to any of the sites that are within domain of the electronic map.

The service server then searches the contents (English conversation multimedia) set up to be stored as corresponding to the present location of the mobile terminal (S6).

The service server next transmits the contents found by the search to the mobile communication network (S7). Then, in the mobile communication network, the contents (English conversation multimedia) for the corresponding site transferred from the service server are transmitted to the mobile terminal (S8). This transfer is preferably preformed according to a call-set-up procedure.

Specifically, the service server transfers the English conversation multimedia for the corresponding site to the inter-gateway (IG) of the mobile communication network. The inter-gateway (IG) converts the transferred conversation contents into WAP data, and converts a transmission bandwidth and transmission speed of the data. The mobile switching center (MSC) receives the converted WAP data from the IG and then transmits the received data to the mobile terminal through the base controller and base transceiver station of the mobile communication network.

Finally, the mobile terminal outputs the contents (English conversation multimedia), received as WAP data, as video, audio and text characters at the same time through a display module (S9).

Figure 3:
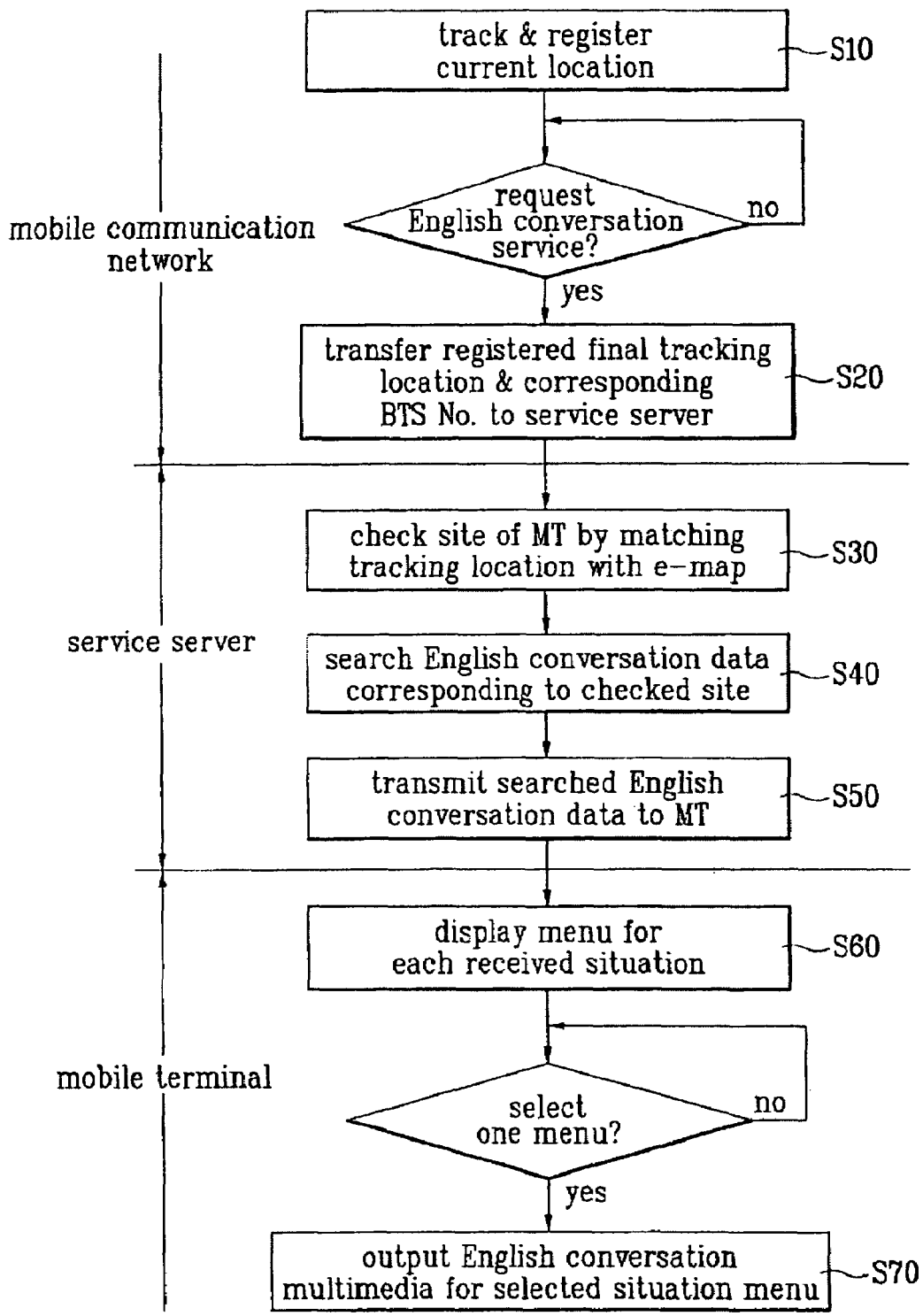
FIG. 3 is a flowchart illustrating a process of providing a position-matched English conversation service according to a preferred embodiment of the present invention.

FIG. 3 illustrates a process of providing a position-matched English conversation service according to the preferred embodiment of the present invention. Referring to FIG. 3, in a mobile communication network, the previously-registered tracking location of a mobile terminal is preferably deleted, and a present tracking location is registered to a home location register (HLR) (S10). Updates of the location are preferably preformed continuously by continuous location tracking of the mobile terminal. A number of the base transceiver station governing a service area in which the mobile terminal is located is also registered in the home location register in addition to the tracking location.

At the registered final tracking location, when an English conversation service is requested from the mobile terminal, the location server transfers the final tracking location of the mobile terminal registered in the home location register and the corresponding base transceiver station number to the service server (S20).

Additionally, when the information request is made, the tracking location of the mobile terminal and the base station transceiver station number are transferred from the mobile communication network, and the service server matches the transferred tracking location with the electronic map corresponding to the transferred base transceiver station number. Thus, the site at which the mobile terminal is currently located is obtained and confirmed (S30).

The service server searches the multimedia data for the site corresponding to the current location (i.e., a service request location) of the mobile terminal among various kinds of multimedia data stored differently for various sites (S40).

In this case, the multimedia data are packet data that combine various data. The data preferably includes video data, representing a virtual situation (for example, a conversation between two speakers) corresponding to each of the sites which are determined to be in domain of the electronic maps for the respective base transceiver stations. The data also includes audio data, representing the conversation in the virtual situation, and text data represented by characters expressing the conversation contents of the audio. The multimedia data, which are the respective English conversation multimedia corresponding to various situations for the respective sites, are preferably pre-stored in the service server. Therefore, the English conversation data are constructed with various kinds of English conversation multimedia classified into the respective sites and a menu of the various situations of the respective sites.

The multimedia data are transferred to the corresponding mobile terminal (S50). For example, in a constructional aspect of the English conversation data according to the preferred embodiment, a menu for the previously-established situations corresponding to the current site of the mobile terminal is initially transmitted. Then, the English conversation multimedia of the selected situation among the various English conversation multimedia of the current site is transmitted after menu of the specific situation is selected by the mobile terminal user.

As another example, are all of the English conversation multimedia of the site corresponding to the final location of the mobile terminal, as well as the menus for the various situations corresponding to the site can be simultaneously and previously transmitted to the mobile terminal.

The menus for the received situations are preferably shown on the mobile terminal (S60). When one of the menus for the shown situations is selected, the multimedia data for the selected menu item is outputted (S70). The output of the multimedia data is carried out in a manner that a video and audio of the selected menu item are played. Additionally, a transcript of the audio portion may be displayed in any language.

Figure 4:
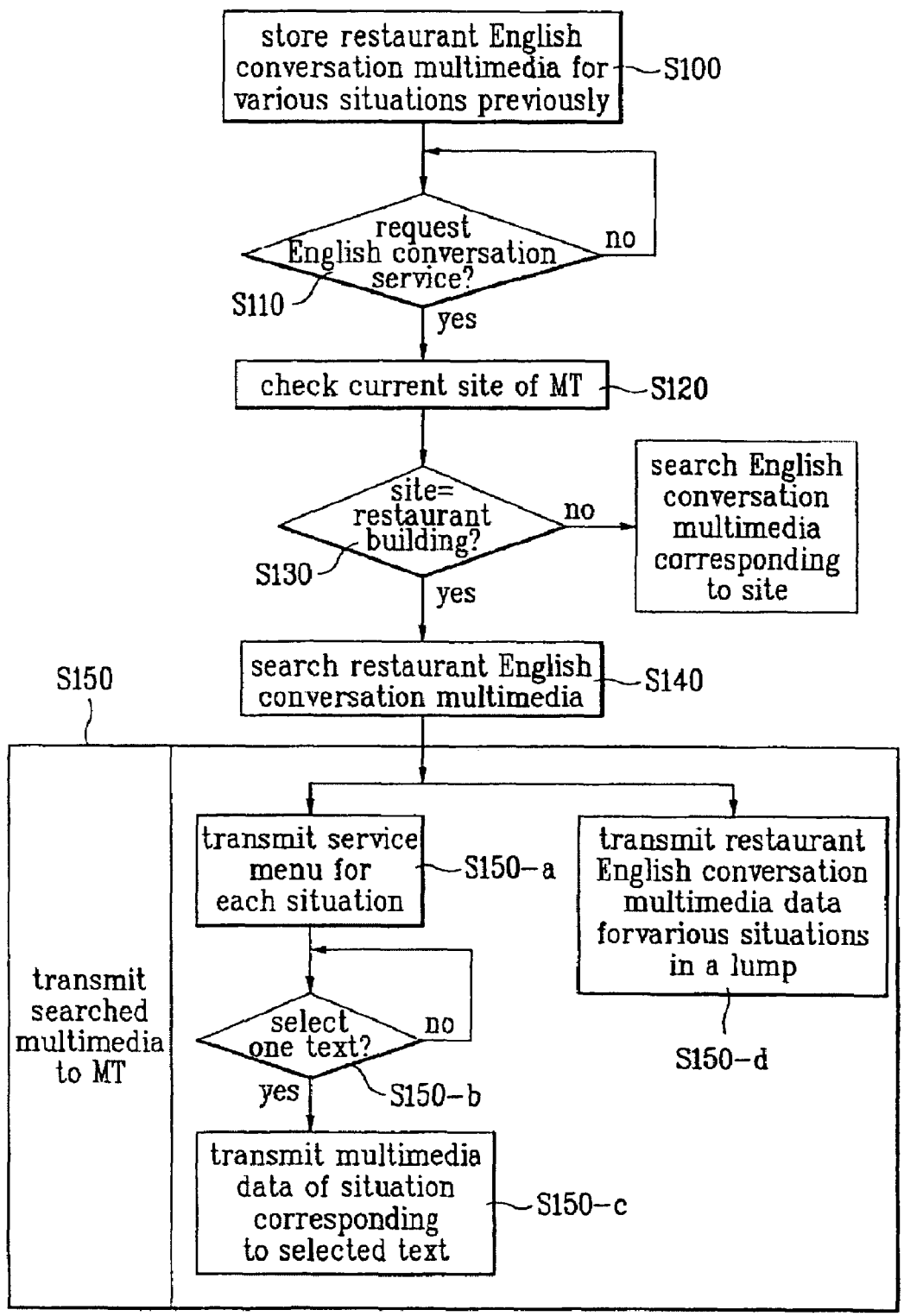
FIG. 4 is a flowchart illustrating a process of providing a position-matched English conversation service according to a preferred embodiment of the present invention.

FIG. 4 is a flowchart illustrating an exemplary process of providing a position-matched multimedia service according to a mobile terminal located at a restaurant according to the preferred embodiment. In this example, the multimedia data is in a conversation format, although any format could be used.

Referring to FIG. 4, multimedia for the restaurant English language conversation are previously stored in the service server (S100). As a matter of course, the service server stores various kinds of conversation multimedia for the respective sites, such as airport conversation multimedia, hotel conversation multimedia, and the like. The English language conversation multimedia for the respective sites are classified and stored correspondingly.

In this example, the restaurant conversation multimedia may include multimedia data for various situations, including ordering meals in English at the restaurant, dining at the restaurant, paying the bill at the restaurant, and the like. The multimedia data are preferably classified and stored in accordance with the corresponding situations. That is, for the various situations which may occur in restaurant, the service server stores a first situational multimedia data for ordering in the restaurant, a second situational multimedia data for dining in the restaurant, a third situational multimedia data for paying the bill in restaurant, and the like by classification.

When an English conversation service is requested by a specific mobile terminal (S110), the service server determines the present location of the mobile terminal requesting the service, and a site (building or public place) in accordance with the present location (S120). In this example, in order to check the present location of the mobile terminal and the corresponding site, a location server transfers a base transceiver station number of the mobile terminal, which is registered in a home location register, and location tracking information of the mobile terminal transferred from the mobile switching center (MSC).

Specifically, the service server matches the transferred tracking location (coordinate value) with an electronic map of the base transceiver station number transferred from the location server, thereby confirming the site (building or public place) at which the mobile terminal is currently located.

If the site according to the location of the confirmed mobile terminal is a restaurant (S130), the service server searches the restaurant English conversation multimedia previously stored therein (S140) and then transmits the resultant multimedia to the corresponding mobile terminal (S150).

In transmitting the resultant restaurant English conversation multimedia, the service server initially transmits the service menu, including the text expressing the respective situations (S150-a). The menus are a result of restaurant English conversation multimedia being stored and classified into the various situations. After one of the menu items has been selected through the mobile terminal (S150-b), the service server transmits the multimedia data corresponding to the selected menu item to the mobile terminal (S150-c).

In certain circumstances, the service server transmits the requested restaurant English conversation multimedia data as a whole with one data stream (S150-d). In this case, the transmitted data stream is constructed with text expressing the respective situations that may occur in the restaurant, videos reproducing the situations corresponding to the text of the respective situations, and audio played with the corresponding video.

As one of the text items for the respective situations received from the service server is selected, the mobile terminal plays the video reproducing the selected situation and the English conversation audio corresponding to the video. In addition, the contents of the English conversation played by the audio and a translation of another language for the English conversation contents are simultaneously displayed.

As mentioned in the above description, the preferred embodiment transmits content corresponding to a particular respective site (restaurant, airport, station, etc.) in accordance with the present location of the tracked mobile terminal. The location information is provided based on the location tracking of the mobile communication network, thereby enabling to provide a live language education for a given circumstance. By providing the English conversation multimedia matched with the location of the mobile terminal, the preferred embodiment enables one to cope immediately with encountering a foreigner or speaking in a foreign language.

Moreover, the preferred embodiment based on the location tracking information of the mobile terminal provides English conversation video & audio, as well as text relating to the video & audio, which are suitable for the particular site (building or public place) where the mobile terminal is currently located, thereby enabling one to improve the study effect on the spot.

Moreover, location specific multimedia can be provided to a mobile terminal, allowing a user to gain a greater understanding of the surroundings.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of providing a position-matched information service, comprising:
   searching a database of information for content corresponding to a particular business, a particular building or a particular public place of a current location of a mobile terminal determined by location tracking when information content is requested from the mobile terminal; and
   transmitting the searched content to the mobile terminal, the transmitted content including conversation multimedia relevant to the particular business, the particular building or the particular public place of the current location of the mobile terminal, wherein the location tracking comprises:
  receiving an inherent number given to a base transceiver station controlling the mobile terminal and a tracking location of the mobile terminal, the tracking location being carried out on a continuous basis from a network;
  matching the received inherent number of the base transceiver station with a previously stored electronic map of a service area of the base transceiver station; and
  determining the particular business, the particular building or the particular public place coinciding with the tracking location of the mobile terminal on the electronic map as a site of the mobile terminal, and wherein transmitting the searched content to the mobile terminal includes:
  transmitting a menu to the mobile terminal, the menu providing a list of a plurality of situations corresponding to the determined particular business, the determined particular building or the determined particular public place;
  displaying the menu and the list of the plurality of situations on the mobile terminal; and
  transmitting, when a specific one of the situations is selected from the displayed menu and the displayed list of the plurality of situations on the mobile terminal, at least one conversation multimedia phrase to the mobile terminal, the at least one conversation multimedia phrase corresponding to the selected specific one of the situations from the displayed menu and the displayed list, wherein the conversation multimedia phrases include a plurality of first situation multimedia data for ordering meals, a plurality of second situation multimedia data for dining at the restaurant, and a plurality of third situation multimedia data for paying a bill at the restaurant, and wherein one of the first, second, and third situation multimedia data selected from the mobile terminal is transmitted to the mobile terminal.

2. The method of claim 1, wherein the information content comprises multimedia information content.

3. The method of claim 2, wherein the multimedia information comprises at least one of video, audio and text data.

4. The method of claim 2, wherein the multimedia information content comprises at least one of a series of conversational phrases appropriate to the current location of the mobile terminal.

5. The method of claim 1, wherein determining the particular business, the particular building or the particular public place comprises determining that the mobile terminal is located within a restaurant, and
  wherein searching the database comprises searching for information corresponding to the restaurant the mobile terminal is located within.

6. A method of providing a position-matched information service, comprising:
  tracking a location of a specific mobile terminal;
  registering a final location of the mobile terminal;
  searching a specific multimedia data stored in a memory that corresponds to the registered final location when the mobile terminal requests a multimedia service at the registered final location; and
  transmitting the multimedia data to the mobile terminal, the transmitted multimedia data including a plurality of English conversation multimedia phrases relating to a plurality of conversations at one of a business or a building corresponding to the registered final location of the tracked specific mobile terminal, wherein the plurality of English conversation multimedia phrases transmitted to the mobile terminal comprise a plurality of phrases to be used at the one of the business or the building corresponding to the registered final location of the tracked specific mobile terminal,
  wherein tracking the location comprises:
  receiving an inherent number given to a base transceiver station controlling the mobile terminal and a tracking location of the mobile terminal, the tracking location being carried out on a continuous basis from a network;
  matching the received inherent number of the base transceiver station with a previously stored electronic map of a service area of the base transceiver station; and
  determining the one of the business or the building coinciding with the tracking location of the mobile terminal on the electronic map as the site of the mobile terminal, wherein the English conversation multimedia phrases include a plurality of first situation multimedia data for ordering meals, a plurality of second situation multimedia data for dining at the restaurant, and a plurality of third situation multimedia data for paying a bill at the restaurant, and wherein one of the first, second, and third situation multimedia data selected from the mobile terminal is transmitted to the mobile terminal.

7. The method of claim 6, wherein searching the specific multimedia data comprises:
  determining the one of the business or the building in accordance with the registered final location of the mobile terminal; and
  searching multimedia data corresponding to the determined one of the business or the building among a plurality of stored multimedia data, so as to provide data corresponding to the determined one of the business or the building.

8. The method of claim 7, wherein the multimedia data comprises English language phrases appropriate to the determined one of the business or the building.

9. The method of claim 7, wherein the multimedia data comprises packet data having video data representing virtual situations for each of a plurality of sites, audio data representing conversations pertaining to the virtual situations, and text data expressing a text transcription of conversation contents of the audio data.

10. The method of claim 9, wherein the audio data is presented in a first language and the text data is presented in a second language.

11. The method of claim 6, wherein determining the one of the business or the building comprises determining that the mobile terminal is located within a restaurant, and
  wherein searching the specific multimedia data comprises searching for information corresponding to the restaurant the mobile terminal is located within.

12. The method of claim 6, wherein the plurality of English conversation multimedia phrases are classified into a first situation multimedia data for ordering meals, a second situation multimedia data for dining at a restaurant, and a third situation multimedia data for paying a bill at a restaurant.

13. A method of providing a position-matched English conversation service, comprising:
  storing a plurality of English language conversational phrases as multimedia data corresponding to a plurality of situations of a plurality of specific locations;
  determining a specific location of a mobile terminal in accordance with a location tracking procedure when an English conversation service is requested from the mobile terminal;

determining which one of the plurality of specific locations corresponds to the specific location of the mobile terminal;

storing an electronic map of a service area for each base transceiver station servicing the mobile terminal; and transmitting a plurality of English language conversation multimedia phrases to the mobile terminal, the plurality of English language conversation multimedia phrases including a plurality of conversations relevant to the specific location of the mobile terminal, wherein the location tracking procedure comprises:

receiving an inherent number given to a base transceiver station controlling the mobile terminal and a tracking location of the mobile terminal through carrying out on a continuous basis from a network;

matching the received inherent number of the base transceiver station with a corresponding previously stored electronic map of the service area of the base transceiver station; and determining the specific location coinciding with the tracking location of the mobile terminal on the electronic map as the site of the mobile terminal, wherein transmitting the plurality of English language conversation multimedia phrases to the mobile terminal comprises:

transmitting a menu and a list to the mobile terminal and displaying the list, the displayed list of the plurality of situations corresponding to the determined specific location, and transmitting to the mobile terminal, when a specific one of the situations is selected from the displayed list on the mobile terminal, the English language conversation multimedia phrase corresponding to the selected specific one of the situations from the displayed list on the mobile terminal, wherein the related English conversation multimedia phrases include a plurality of first situation multimedia data for ordering meals, a plurality of second situation multimedia data for dining at the restaurant, and a plurality of third situation multimedia data for paying a bill at the restaurant, and wherein one of the first, second, and third situation multimedia data selected from the mobile terminal is transmitted to the mobile terminal.

14. The method of claim 13, wherein when the menu is displayed on the mobile terminal and a menu item for a desired situation is selected by a user, a video and a conversation audio reproducing the selected menu item are played, and a transcription of the audio is displayed as text on the mobile terminal.

15. The method of claim 13, wherein determining the specific location comprises determining that the mobile terminal is located within a restaurant, and wherein transmitting the English language conversation multimedia phrase comprises transmitting information corresponding to the restaurant the mobile terminal is located within.

16. The method of claim 13, wherein the plurality of English conversation multimedia phrases are classified into a first situation multimedia data for ordering meals, a second situation multimedia data for dining at a restaurant, and a third situation multimedia data for paying a bill at a restaurant.

* * * * *